Patented Aug. 8, 1933

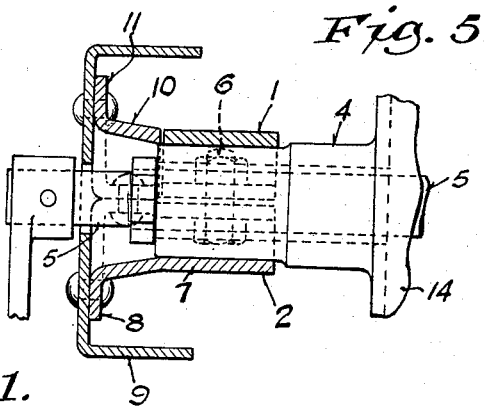
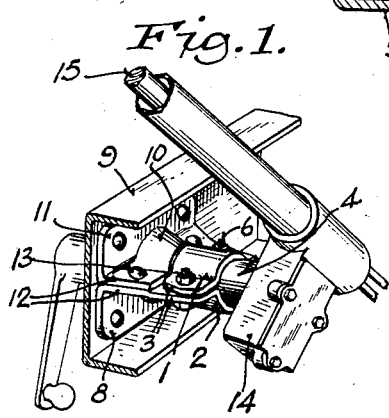
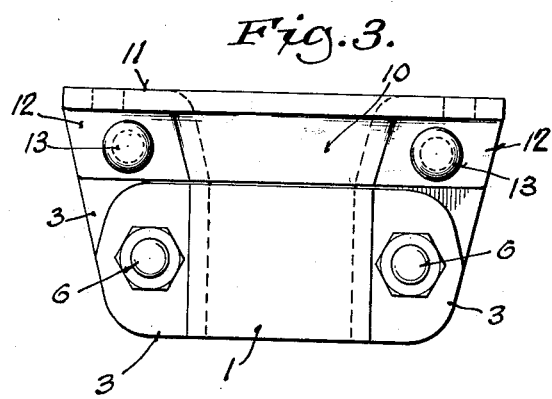
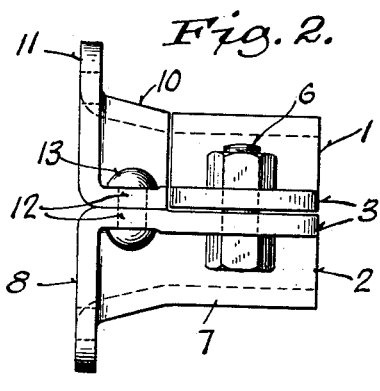
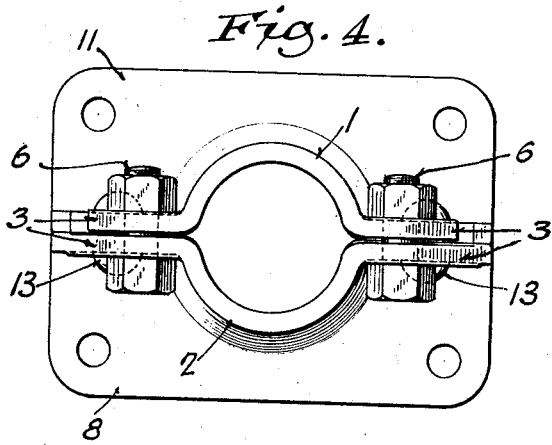

1,921,239

UNITED STATES PATENT OFFICE 1,921,239

STEERING-POST BRACKET FOR AUTOMOBILE FRAMES

Henry Miller, Milwaukee, Wis., assignor to A. O. Smith Corporation, Milwaukee, Wis., a Corporation of New York Application November 10, 1928
Serial No. 318,522

3 Claims. (Cl. 308—34)

This invention relates to a steering-post bracket for automobile frames.

Heretofore, steering-post brackets have been made of malleable castings and drop forgings, and have been expensive and slow to manufacture.

The object of the present invention is to provide a steering-post bracket which is strong and light in weight and which may be readily and economically manufactured.

According to the invention the bracket is formed from sheet metal and comprises a tubular structure having means to fasten the same to the side bar of an automobile frame and means to hold the steering-shaft housing.

The accompanying drawing illustrates a steering-post bracket made in accordance with the invention and the views of the drawing are as follows:

Figure 1 is a perspective view of the bracket, side-bar and steering-post.

Fig. 2 is a side elevation of the bracket.

Fig. 3 is a plan view of the bracket.

Fig. 4 is an elevation of the clamping end of the bracket.

Fig. 5 is a vertical longitudinal section through the bracket and side-bar, showing the steering-shaft housing in position.

The bracket comprises in general a tubular clamp and a supporting base therefor.

The clamp consists of two semi-tubular members 1 and 2 having lateral flanges 3 at their side edges. The members 1 and 2 oppose each other to form a tubular structure to receive the housing 4 for the steering shaft 5, and said members are fastened together by bolts 6 which pass through the corresponding flanges 3 thereof.

The supporting base for the clamp is formed integrally with the clamping member 2 at one end thereof, and has a semi-tubular body 7 and base flange 8, the latter being adapted to be riveted or otherwise fastened to the channel side bar 9 of an automobile frame.

In order to strengthen the support, a brace is preferably employed, similar in shape to the supporting base, and arranged opposite thereto and in alinement with the movable member 1 of the clamp. The brace comprises a semi-tubular body 10 having a base flange 11 at one end and arranged complementary to the body 7 of the supporting base to provide a tubular structure through which the shaft 5 extends. The semi-tubular bodies 7 and 10 have lateral flanges 12 which are secured together by rivets 13. The base flange 11 of the brace is riveted to the side bar 9 in a similar manner to the fastening of the base flange 8 of the support.

The brace may be formed integral with the movable clamping member 1 but it is preferable to form it separate therefrom as shown in the drawing.

The shaft 5 extends into a gear box 14 arranged on the housing 4 and is controlled by the steering post 15 to which the steering wheel of the automobile is fastened.

The several parts of the bracket are stamped or otherwise formed from sheet metal and thus lend themselves to rapid and economical methods of production.

The bracket thus provided is tubular throughout substantially its entire length and has supporting means arranged at one end thereof and clamping means arranged at the other end thereof.

The bracket is stronger and more durable than the former drop forged brackets and may be manufactured with a few simple operations without the application of heat and without appreciable waste of material.

The bracket herein disclosed may be modified in various ways within the scope of the invention claimed.

Having thus described my invention, what I claim and desire to secure by Letters Patent of the United States, is:

1. A steering post bracket for vehicles formed of sheet metal and comprising a pair of semi-tubular clamping members having laterally extending cooperating flanges for securing said members together in clamping relation, one only of said clamping members being provided with a flange at one end for facilitating attachment thereof to the frame of a vehicle, a brace for said flanged clamping member having a flange for attachment to the vehicle frame, and means for securing said brace to said flanged clamping member with the flanges of both extending oppositely in substantially the same plane.

2. A steering post bracket comprising a sheet metal tubular support having a tapering inner periphery, means on one end for attaching the support to the automobile frame, and sheet metal clamping means on the other end to hold the steering post.

3. A bracket for supporting a steering post housing on a side frame comprising, a support having a semi-cylindrical portion for receiving the housing, a clamping strap for holding the housing in the semi-cylindrical portion of the support, a depending flange formed integral with the support for attaching the bracket to the side frame, and a brace extending upwardly from the support and substantially in the plane of the flange to provide additional means for attaching the bracket to the side frame and carrying the weight.

HENRY MILLER.